(12) United States Patent
Möller (10) Patent No.: US 8,911,520 B2
(45) Date of Patent: Dec. 16, 2014

(54) METHOD AND DEVICE FOR REPROCESSING CO₂ CONTAINING EXHAUST GASES

(75) Inventor: Roland Möller, Truchtlaching (DE)

(73) Assignee: Ecoloop GmbH, Goslar (DE)

( * ) Notice: Subject to any disclaimer, the term of this patent is extended or adjusted under 35 U.S.C. 154(b) by 1193 days.

(21) Appl. No.: 12/809,383

(22) PCT Filed: Dec. 18, 2008

(86) PCT No.: PCT/EP2008/010869
§ 371 (c)(1),
(2), (4) Date: Dec. 22, 2010

(87) PCT Pub. No.: WO2009/080297
PCT Pub. Date: Jul. 2, 2009

(65) Prior Publication Data
US 2011/0094159 A1      Apr. 28, 2011

(30) Foreign Application Priority Data
Dec. 20, 2007   (DE) .......................... 10 2007 062 413

(51) Int. Cl.
*C01B 3/36*      (2006.01)
*C01B 3/16*      (2006.01)
(Continued)

(52) U.S. Cl.
CPC ................. *B01D 53/62* (2013.01); *Y02C 10/04* (2013.01); *C10J 2300/0996* (2013.01); *C01B 2203/0283* (2013.01); *C01B 3/16* (2013.01); *C10B 49/06* (2013.01); *C10J 3/14* (2013.01);
(Continued)

(58) Field of Classification Search
CPC .... Y02C 10/04; Y02C 10/06; B01D 53/1475; B01D 53/62; B01D 2257/504
See application file for complete search history.

(56) References Cited

U.S. PATENT DOCUMENTS 3,841,851 A   10/1974   Kaiser
4,436,532 A   3/1984   Yamaguchi et al.
(Continued)

FOREIGN PATENT DOCUMENTS

DE   34 26 912   1/1986
DE   3617364   11/1987
(Continued)

OTHER PUBLICATIONS

International Search Report for PCT/EP2008/010869.

*Primary Examiner* — Imran Akram
(74) *Attorney, Agent, or Firm* — Marvin Petry; Stites & Harbison PLLC (57) ABSTRACT

The invention relates to a method for reprocessing $CO_2$-containing exhaust gases in a multistage reduction process. The $CO_2$-containing exhaust gas is conducted in the counter stream to a solid mass stream of inert bulk material and organic material that can be thermally decomposed through a plurality of zones (4, 3, 2, 1) into a pressure equalization region and is thereby converted into pyrolysis gases. In the flow direction of the solid mass stream in a fuel gas production stage (1) at 250-700° C., the organic matter is thermally decomposed under reducing conditions into short-chained hydrocarbons, hydrogen and carbon monoxide to produce coke and residue. In an intermediate stage (2) with increasing temperature, oxidation of the pyrolysis coke is carried out, wherein the developing carbon monoxide is suctioned off counter to the solid mass stream in the direction of the fuel gas production stage (1). In a carbon monoxide production stage (3) at 800-1,600° C., the remaining coke residue is converted with carbon dioxide into carbon monoxide by setting the pressure and temperature according to the Boudouard equilibrium. In a cooling stage (4), the developing solid residual material and the bulk material are cooled in the $CO_2$ counter stream to below 100° C. and are separated, wherein the bulk material is returned to the cycle.

20 Claims, 1 Drawing Sheet

(51) Int. Cl.
  *C10B 49/06* (2006.01)
  *B01D 53/62* (2006.01)
  *C10J 3/14* (2006.01)
  *C10J 3/66* (2006.01)

(52) U.S. Cl.
  CPC .... *C10J 2300/0959* (2013.01); *C10J 2300/092* (2013.01); *C10J 2300/16* (2013.01); *C10J 2300/093* (2013.01); *B01D 2257/504* (2013.01); *C10J 3/66* (2013.01); *C10J 2300/1807* (2013.01); *C10J 2300/0969* (2013.01); *C10J 2300/0946* (2013.01)
  USPC ..................................................... 48/197 R

(56) References Cited

U.S. PATENT DOCUMENTS

| | | | |
|---|---|---|---|
| 4,488,398 A | | 12/1984 | Noguchi |
| 4,505,808 A | * | 3/1985 | Brunner et al. ............... 208/428 |
| 4,558,027 A | * | 12/1985 | McKee et al. ................ 502/181 |
| 4,748,010 A | | 5/1988 | Walker |
| 5,405,595 A | | 4/1995 | Tomikawa et al. |
| 5,517,815 A | | 5/1996 | Fujioka et al. |
| 5,700,437 A | | 12/1997 | Fujii et al. |
| 5,765,365 A | | 6/1998 | Fujioka et al. |
| 5,820,300 A | | 10/1998 | Sonoda et al. |
| 5,832,712 A | | 11/1998 | Ronning et al. |
| 5,904,908 A | | 5/1999 | Suzuki et al. |
| 6,051,161 A | | 4/2000 | Suzuki et al. |
| 6,270,731 B1 | | 8/2001 | Kato et al. |
| 6,527,980 B1 | | 3/2003 | Roden et al. |
| 6,664,101 B2 | | 12/2003 | Wild |
| 6,767,527 B1 | | 7/2004 | Aasen et al. |
| 7,473,286 B2 | | 1/2009 | Blaschke et al. |
| 2004/0126293 A1 | | 7/2004 | Geerlings et al. |
| 2005/0100496 A1 | * | 5/2005 | Blaschke et al. ............ 423/418.2 |
| 2007/0209479 A1 | * | 9/2007 | Kooij ............... 75/413 |
| 2008/0236390 A1 | | 10/2008 | Anders et al. |
| 2009/0156695 A1 | * | 6/2009 | Young ............ 518/702 |
| 2009/0320368 A1 | * | 12/2009 | Castaldi et al. .................. 48/76 |
| 2013/0213280 A9 | * | 8/2013 | Lackner et al. ............... 110/216 |

FOREIGN PATENT DOCUMENTS

| | | |
|---|---|---|
| DE | 3817690 | 12/1989 |
| DE | 199 40 371 | 3/2001 |
| EP | 107 131 | 5/1984 |
| EP | 0945162 | 9/1999 |
| EP | 1 571 105 | 9/2005 |
| GB | 1 453 787 | 10/1976 |

* cited by examiner

METHOD AND DEVICE FOR REPROCESSING $CO_2$ CONTAINING EXHAUST GASES

The instant invention relates to a method for reprocessing $CO_2$-containing exhaust gases in a multi-stage reduction process.

Global warming is considered to be one of the greatest present-day problems. The slow rise in the average temperature of the near-earth atmosphere and of the oceans, observed in the course of the past decades, as well as further warming expected in the future, are called global warming. In accordance with present-day scientific understanding, its main cause lies in the increase of the greenhouse effect caused by humans. This changes the composition of the atmosphere, primarily because of the burning of fossil fuels and the emission of carbon dioxide ($CO_2$) resulting from this. These emissions are caused by human actions in connection with factories, industrial installations, thermal power plants, automobiles, aircraft, etc. Thus, the reduction of carbon dioxide emissions is considered to be one of the most important measures for the protection of the environment.

Numerous efforts for achieving a lowering of carbon dioxide emissions are undertaken worldwide. In this regard the development and employment of alternative energy sources having an improved, or even neutral $CO_2$ balance, play an essential part. These are, for example, fuel cell technology, energy generation from the sun, the wind or the water, use of renewable energy carriers, etc. A further attempt consists in the global extension of nuclear energy which, however, because of other important environmental risks and unresolved disposal problems, is politically very controversial.

Intensive work is being performed in connection with an improvement in the energy efficiency in all conceivable areas of human actions in order to achieve at least a slow-down in the rise of carbon dioxide emissions. This relates to the efficiency of the use and conversion of energy, i.e. the relationship of usefulness to energy outlay. This relationship is relevant in connection with the generation of secondary energy, such as of generating electrical power in power plants, for example, as well as in connection with the use of primary and secondary energy. For example, work is continuously being performed in connection with the improvement of the effectiveness in electrical power generation through integrated power plant technology. Thus, for example, for generating electrical current, autothermal coal gasification technology in combination with power plants was proposed in numerous applications. The gaseous gasification products could be used in gas turbines by means of this and, by means of correspondingly integrated energy couplings it was thus possible to realize an improvement in the degree of efficiency of such installations. Methods of this type are disclosed, for example, in DE 3241169 C2, DE 694 04 187 T2, DE 3817690 A1 or DE 3617364 A1. Furthermore, attempts are being continuously made to optimize the specific energy requirements of industrial processes, residential buildings, motor vehicles, electric appliances, etc.

Further research and development projects have made it their goal to design large emitters of carbon dioxide, for example coal-fired power plants, as so-called carbon dioxide-free power plants. Here, methods are proposed, which provide an adsorption, or absorption, of carbon dioxide from flue gases by means of washing systems using defined adsorption, or absorption, media. Such methods are described, for example, in DE 697 26039, DE 695 03 036, DE 10 2005 050 385 A1, DE 699 31 418 T2, DE 694 32 376 T2, DE 694 28 057 T2 and DE 603 10 594 T2. Further methods propose the enrichment of carbon dioxide from flue gases by means of membrane technology disclosed, for example, in DE 699 10 441. Other methods, for example in DE 199 40 371, describe the removal of carbon dioxide from flue gases by freezing. In DE 698 15 762 T2, a further method discloses the conversion of carbon dioxide into solid carbon by means of hydrogen.

Methods for the enrichment, or respectively separation of carbon dioxide from flue gases require an appropriate storage of the carbon dioxide in order to permanently prevent an emission into the atmosphere. Methods to this end are proposed, which provide for the removal of carbon dioxide in the deep sea. Such methods are for example disclosed in DE 691 04 274 T2 or DE 696 10 231 T2. A further approach consists in the storage of liquefied carbon dioxide in the earth's crust. Such a method is described in EP 1 571 105 A2, for example. In EP 0 963 780 A1, a further method proposes the removal of $CO_2$ from waste gases, in which this $CO_2$ is converted underground to methane by bacterial conversion and is stored there.

Besides the above described large emitters of carbon dioxide there exist processes with very large energy requirements which, besides the $CO_2$ emissions from burning fossil energy carriers, additionally create $CO_2$ as an ancillary product, and therefore emit a very large $CO_2$ load in the form of flue gas and process gas. These are calcination processes, which in particular convert carbonates into oxides by the thermal splitting-off of $CO_2$. Here, calcination furnaces heated by fossil fuels are mainly employed.

For generating the required high temperatures, calcination furnaces have burner zones or burner lances, which can be burner systems which can be operated by means of various fossil energy carriers, such as, for example, natural gas, heating oil or carbon carriers in dust form. Alternative energy carriers are also employed in some areas. In the cement industry the employment of secondary fuels, for example, and in the calcium industry the use of animal fats, for example, constitute the state of the art.

For example, calcination furnaces are employed in a very large scale for producing cement, magnesia (magnesium oxide) and for quicklime (calcium oxide). Besides some special furnace types, rotary tubular kilns are mainly employed in the cement area. Calcination shaft kiln furnaces prevail for the production of quicklime, because this furnace type is particularly suitable for producing lumps of quicklime and has, in comparison with other furnace types, such as for example rotary tubular kilns, the advantage of lower specific energy requirements, and therefore lower specific $CO_2$ emissions.

World-wide, calcium oxide constitutes one of the most important basic materials, the annual production of which is estimated to be approximately 140 million tons.

Limestone (calcium carbonate) of various grain size, but in lumpy form, is fed as the raw material to the so-called lime shaft kilns with the aid of special charging systems at the upper end of the shaft via the cover. In most cases, so-called rotary bucket systems are employed, which prevent the unmixing of the material that is due to different grain size.

The limestone then passes through the kiln from top to bottom and in the process is continuously heated by the heating gases flowing from the bottom to the top. As a rule, these heating gases are generated by direct firing of the kiln contents by means of fossil fuel in one or several burner zones. In the burner zone, or respectively in the vicinity of the burner lances, the limestone is heated up to the core of the particles to approximately 900 to 1,200° C. A thermal separation of the calcium carbonate takes place because of this, so that carbon dioxide is split off, which then, together with the heating gases, flows upwards through the kiln contents. This is also called thermal deacidification, from which quicklime results as the solid residue. After passing through the burner zone, the quicklime is cooled off in the lower kiln area by oppositely flowing combustion air, which is metered in at the kiln bottom, is released from the kiln and thereafter is converted into defined grain size fractions by sieving.

The fuels employed in the production of quicklime are permitted to have only a very low sulfur content, because the sulfur dioxide being created in the course of combustion reacts with the bulk calcium material in the kiln and leads to an intolerable loss of quality of the quicklime. Furthermore, the burning of fossil fuels as an admixture to the limestone material is only possible with fuels which are low in ash and as pure as possible in order to reduce a contamination of the quicklime.

The carbon dioxide being created as a co-product is mixed with the heating gases from the direct firing and leaves the kiln through one or several gas outlet openings in the upper kiln area, where dust carried along by the gas is subsequently removed by means of filter arrangements and the gas is customarily released into the atmosphere as flue gas. As a rule, lime kilns are operated with air as the oxidation gas and have a carbon dioxide content of up to 28 vol % in the flue gas. Because as a rule the flue gas is not cleaned, it is only possible to a limited extent to admix fuels which contain a large portion of volatile organic compounds, such as in the case of anthracite, for example, to the bulk material in calcium kilns, since these compounds are driven out in the burner zone and are emitted together with the flue gas.

The described thermal method is very energy-intensive, since for the production of quicklime in non-optimized installations up to 4.9 GJ of thermal energy are required per ton of quicklime produced. This means that very large specific amounts of fossil fuels are required for heating the calcination furnaces which, together with the $CO_2$ being generated in the thermal deacidification of the calcium carbonate, lead to considerable $CO_2$ emissions (see Table 1, below).

TABLE 1

| Fossil fuel | Required fossil fuel [t/t CaO] | Total $CO_2$ emissions from fossil burning and thermal deacidification [t/t CaO] |
|---|---|---|
| Heavy heating oil | 0.11 | 1.13 |
| Anthracite | 0.14 | 1.21 |
| Coke | 0.16 | 1.21 |
| Natural gas | 0.092 | 1.01 |

Great efforts were made in the past to lower the specific energy consumption of the calcination process, and therefore also the $CO_2$ emissions. The specific energy use could be optimized because of various further technical developments of lime kilns. This relates to energy recovery by means of the optimized routing of the combustion air or special shaft structures for optimized energy distribution. Furthermore, a new generation of parallel shaft kilns was developed, in which the waste heat from the combustion process in one of the furnace shafts can be used for preheating the limestone in the second furnace shaft, and this process takes place in alternation in the two furnace shafts.

Although it was possible by means of this technical progress to considerably lower the specific energy use through optimized furnace technology, however, the process naturally has a minimum energy requirement which, in optimally operating kiln installations, lies approximately in the range of 3.5 GJ per ton of quicklime produced and can only be negligibly affected. Because of this, the specific $CO_2$ emissions of approximately 1 ton per ton of quicklime produced (in accordance with the example of anthracite), have arrived at an actually technically feasible minimum.

EP 107 131 B1 describes a method for the gasification of carbon-rich material and the making of products by carbon-thermal reduction. These products, and remaining solid residuals, are removed in a liquid molten state at the bottom of the kiln. The energy balance is negatively affected by this, because the melts, for example in the case of calcium carbide, can be hotter than 2,000° C. Primarily, this document relates to the production of synthetic gases.

DE 103 48 116 A1 describes a method for producing CO of great purity, in which the solid mass flow consists of the organic mass itself, which is to be gasified. It is explicitly pointed out that calcium portions are undesired in this special method.

U.S. Pat. No. 3,841,851 A describes a reactor with a mechanical treatment stage for a reactor bed of a carbon-containing mass and with definite portions of inorganic components. These are melted at the underside of the reactor and are removed in liquid form.

U.S. Pat. No. 6,527,980 B1 describes a catalytically operated reactor, which exclusively employs gaseous starting materials and does not gasify any solids.

U.S. Pat. No. 4,748,010 A describes a two-stage method, in which limestone is partially calcined in a first stage and is then employed in a second stage. The processing of $CO_2$-containing waste gas is not described.

GB 1 453 787 discloses the gasification of carbon-containing combustible material with the introduction of $CO_2$. The employment of a bulk material, which cannot be gasified, as a solid bed is not provided. The carbon-containing materials are intended to be circulated, i.e. they are only partially gasified.

Therefore the object of the invention was to make a method available, which makes the regeneration of $CO_2$-containing waste gas simpler and, in an economically attractive manner, leads to significant savings in fossil fuels.

In accordance with the invention, this object is attained by means of the method of claim 1, in which the $CO_2$-containing waste is converted by means of an economical reduction with an organic mass, which can be pyrolysed, in an almost autothermal process into pyrolysis gas, inter alia, and this pyrolysis gas can again be made available as the combustible gas or the starting material for chemical processes. The bulk material which cannot be gasified is conducted here in a cycle. It constitutes a movable bed and is primarily used as a transport means for the material being used in connection with the process, but does not itself take part in the gasification reaction. At the same time, it assures gas permeability for the gaseous counter-flow.

It has turned out that in the course of using a pyrolyzable organic mass, for example also from waste or residual material reactions and containing plastic materials, or also a biomass, the instant method can be executed to a large extent in an autothermal manner, in which the pyrolyzable organic mass almost entirely provides the energy required for the reduction of carbon dioxide.

Moreover, by means of the method, portions in the form of a pyrolysis coke are created from the pyrolyzable organic mass, which partially makes available the carbon required for the conversion. It has furthermore been shown that the execution of this reduction is especially aided by the use of a lumpy reaction bed consisting of an incombustible bulk material, since the latter also makes possible the counterflow of the gases. The bulk material preferably consists of basic calcinates, such as calcium oxide, for example, so that in this case the formation of dioxins and furans is completely prevented, and the splitting-off of harmful substances, such as heavy metals or halogens, for example, can take place in a particularly simple manner, by bonding them to powdery calcium oxide.

However, in principle other bulk materials can also be employed as movable beds, such as, for example, metallic or ceramic materials, but also the precursor stages of basic calcinates such as, for example, limestone. As a function of the temperature arrangement, the latter can be conducted in an inert state, so to speak, or it can be burned on its surface by a specific temperature increase in the carbon monoxide generation stage, because of which a reactive surface, consisting of CaO, is created which, as previously described, is advantageous for bonding harmful materials.

It was furthermore shown to be particularly advantageous that, by using the reaction bed in counterflow to the generated combustion gas, an almost optimal energy use within the reduction process becomes possible.

Useful grain sizes of the lumpy bulk material conducted in the cycle are on an order of magnitude of 0.5 to 15 cm.

Preferably a temperature of 600 to 1,000° C. is set in the intermediate stage C and the pressure is reduced, so that in this stage a pyrolysis of the organic mass and the Boudouard equilibrium reaction proceed side-by-side at low pressure and at low temperature. It has been shown that at these values the desired reaction processes occur optimally, wherein the indication of the reduced pressure relates to the ambient pressure.

The cooling-off stage assures the particular energy efficiency of the method and provides that only solid residue and large-sized bulk material remain.

In a further development of the method it has been provided for setting a defined pressure in that a mixture of coarse and fine particles of bulk material is used as a pressure storage means in a pressure equalization zone A above the combustion gas generating zone B.

Examples of a temperature and pressure regulation in the individual process zones are the specific composition of the solid masses, i.e. a specific selection of the materials and the distribution of the grain sizes, the selection of the feeding speed of the solid mass flow and/or setting of the ratio of the added chemically decomposable mass to $CO_2$ and the possibly added oxygen-containing gas.

A solid mass flow consisting of coarse and small pieces of lime and a chemically decomposable organic mass is particularly preferred, wherein a carbon carrier can be additionally mixed in, for example in order to obtain specific properties of the pyrolysis gas being generated.

A particularly preferred further development of the invention provides that the above described processes take place in a calcination shaft kiln furnace, in which the bulk material is conducted from the top to the bottom of the kiln shaft, so that the carbon-containing components are thermally split with oxygen excluded to a great extent and with the creation of short-chain molecule-containing pyrolysis gases of a chain length <$C_4$ and pyrolysis coke, and the gases being generated are evacuated from the calcination shaft kiln furnace.

The use of a calcination shaft kiln furnace in connection with the method in accordance with the invention provides the advantage that in the course of the continuous removal at the lower end, the bulk material flow moves through the calcination shaft kiln furnace by means of gravity alone, while the counterflow, consisting of the $CO_2$ introduced at the bottom of the calcination shaft kiln furnace and following it the gases being generated by means of the reactions in the individual zones, can easily move upward in the opposite direction through the porous bulk material flow.

For one, the exclusion of oxygen provides the desired advantageous reduction conditions for generating carbon monoxides, but also counteracts the formation of dioxins and furans, for example, which, with oxygen present, could be created as a result of halogens possibly existing in the thermally decomposable mass.

With this, the method also permits the employment of waste which is difficult to dispose of under normal conditions, such as, for example, wood waste contaminated with PVC or other plastic waste materials, bitumen, floors contaminated by oil, and the like. Thus, the method can also be employed as the removal method of these materials and also, for example, of so-called light shredder fractions in the form of the materials remaining after vehicle recycling.

For these reasons the use of basic calcinates as the bulk materials is inter alia also particularly advantageous, preferably in the form of quicklime. The prevention of the formation of dioxins and furans because of the use of this material as the bulk material has already been addressed above.

The also already mentioned separation of harmful substances by bonding them to powdery calcium oxide can be complemented by the removal of dust-like or small particles from the flowing mass in the combustion gas generation stage D and/or in the intermediate stage C, in which case it is also complementarily or alternatively possible to perform a gas filtration of the pyrolysis gases in order to clean the carried-along fine dust with the pyrolysis residue bonded to the fine particle bulk material.

The filtration of the gaseous products can possibly also take place after a thermal use of the pyrolysis gases has taken place, for example after burning in a combustion chamber, however, a filtration at this location is more expensive as a rule because of the considerably larger amount of gas.

A number of different applications exist for the pyrolysis gases being generated in the course of the method of the invention. For example, the pyrolysis gas can be employed as the synthesis gas for chemical processes and/or for thermal use, or the pyrolysis gases can be separated by means of partial liquefaction and/or pressure change absorption into their main gas components carbon monoxide, hydrogen and hydrocarbons. Then, separated carbon monoxide can be employed, for example, as synthesis gas for use as a material in chemical processes, the same as the separated hydrogen which, however, can be directly used thermally. For example, the hydrocarbons being generated can be employed in thermal and/or material ways, and/or as fuels.

Instead of direct use, or separated into their gas components, the pyrolysis gases can essentially be converted directly into hydrogen and carbon dioxide by means of a water gas shift reaction and catalyzed reaction below 500° C. with water vapor, and the hydrogen can again be employed for thermal and/or material use, and the $CO_2$ is partially returned for providing the counterflow into the reaction zones.

By means of the last described method it is possible to produce pure hydrogen from carbon-containing starting materials of the most varied types, such as for example biomass, plastics or the like, wherein the $CO_2$ emission can be considerably reduced by the immediate return of a partial flow of the carbon dioxide being generated into the reaction zones.

Particularly preferred is a complementation of the method in accordance with the invention to the effect that the $CO_2$ waste gas to be reprocessed is generated in a combustion process using fossil fuels and the pyrolysis gases being generated are again used in the combustion process. It is possible by means of this to considerably reduce the use of fossil fuels, in connection with which the advantage of the method in accordance with the invention had already been pointed out in that it is possible within the framework of $CO_2$-regeneration to employ carbon-containing materials of the most varied types.

A still further particularly preferred embodiment of the method provides that the $CO_2$-containing waste gas is generated in calcination processes, in which carbonates are converted into oxides by splitting-off $CO_2$, and in the process they are used in the regeneration of the pyrolysis gas being created $CO_2$ in order to provide a portion of the heat energy required for the calcination process. It is possible in this way to considerably reduce the $CO_2$ emissions during the very $CO_2$-intensive production of quicklime, in connection with which it can be mentioned as a particular advantage that the calcination shaft kiln furnaces which are preferably employed in $CO_2$ regeneration come close to conventional calcination shaft kiln furnaces.

A device for executing the method in one of the above described embodiments is also an object of the instant application. Such a device is described in claim 20 and in its technical embodiment and in its requirements it very closely approaches conventional calcination shaft kiln furnaces, so that they can easily be implemented in a compound production of the calcination industry.

In what follows, possible embodiments of the instant invention will be addressed in greater detail by means of the attached drawings.

Figure 1:
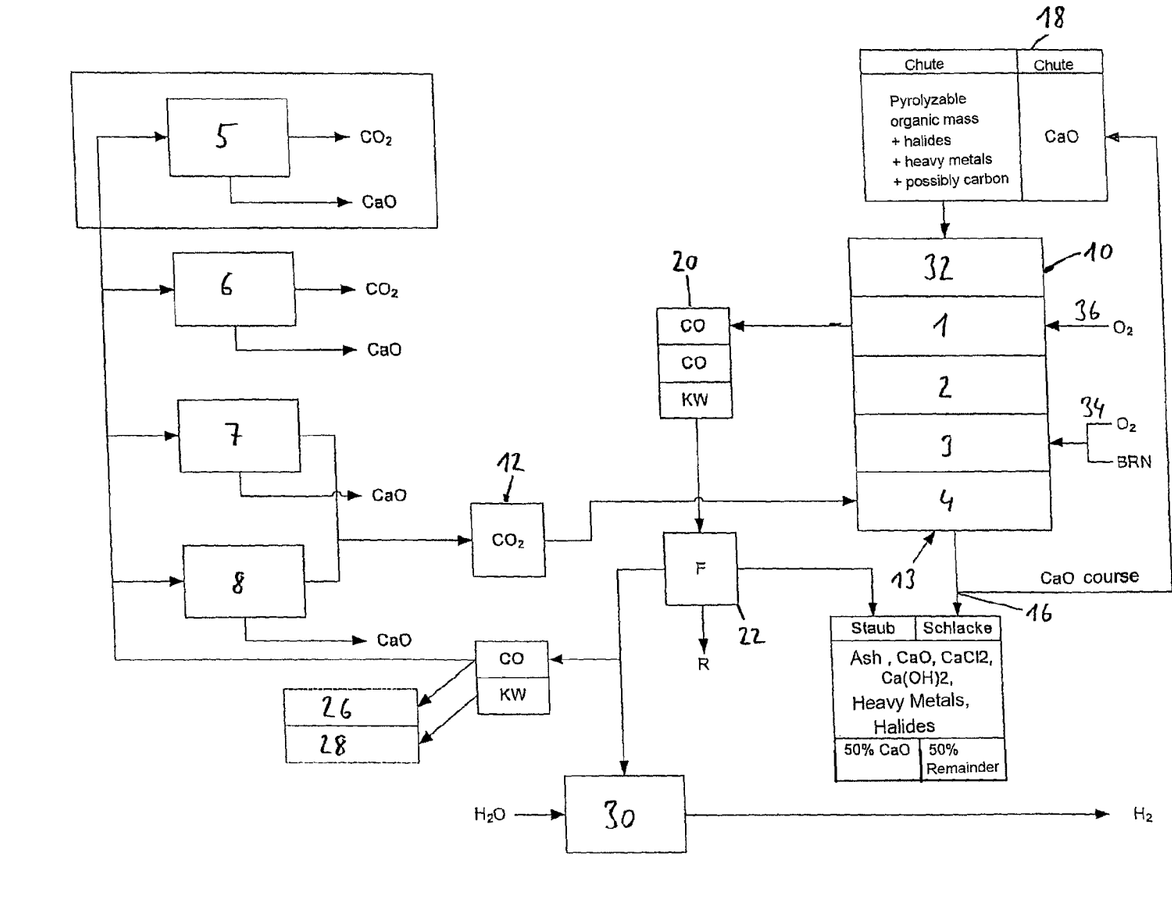

On the right side, the schematic representation shows a method for the regeneration of the $CO_2$-containing waste gas 12. In the process, organic mass which can be pyrolyzed is conducted through four reaction stages 1, 2, 3, 4 in a reaction bed consisting of coarse pieces of calcium oxide. Depending on the requirements, it is in addition possible to admix carbon carriers to the reaction bed. In the first stage, the combustion gas generation stage 1, the organic mass is thermally pyrolyzed under reductive conditions to form short-chain hydrocarbons and hydrogen while producing pyrolysis coke and a residue. The temperature in the first reaction stage 1 is 250 to 700° C. In the second reaction stage, the intermediate stage 2, remnants of the pyrolyzable organic mass continue to produce gaseous hydrocarbons and hydrogen under rising temperatures, and existing carbon dioxide already reacts in direct contact with pyrolysis coke, and possibly admixed carbon carriers, to form carbon monoxide. In the third reaction stage, the carbon monoxide generation stage 3, the remainder of the pyrolysis coke, as well as possibly admixed carbon carriers, are completely converted with carbon dioxide into carbon monoxide by means of the additional introduction of heat energy at 800 to 1,600° C. In the fourth reaction stage, the cooling stage 4, the solid reaction materials consisting of coarse calcium oxide pieces, solid residue containing ash, calcium chloride, calcium hydroxide, heavy metals and halides, as well as fine calcium oxide dust, to which the remnants are bonded, are cooled to below 100° C. and are transferred out via a metering device 14. Following the transfer, the coarse pieces of calcium oxide are separated from the further residue at 16 and are recirculated for again forming a calcium oxide reaction bed. The coarse calcium oxide is again mixed together with the pyrolyzable organic mass at 18 and is conducted—if required with the replenishment of the used-up calcium oxide by fresh—through the four reaction stages.

The carbon dioxide 12—possibly diluted with further gases in a gas mixing arrangement 13—is introduced in counterflow to the solid bed material flow into the cooling stage 4, is conducted through the carbon monoxide generation stage 3 while converting the pyrolysis coke with the $CO_2$ and, if required water, to carbon monoxide and possibly hydrogen, and is aspirated, together with the formed hydrocarbons, as well as hydrogen, at the entry of the combustion gas generation stage 1 by an aspirating device 20. In the course of this, the gas flow conducted in a counterflow completely penetrates the reaction bed and, by switching in a burner, if required in the carbon monoxide generation stage 3, undergoes an additional introduction of hot gases in the form of a gas mixture of $CO_2$ and, if desired, additional oxygen and/or further gases, such as nitrogen or steam. These hot gases can be generated by means of a base load furnace with fossil fuels, and high-sulfur fuels can also be used here, since, similar to chlorine and heavy metals, sulfur dioxides being formed are bound in the calcium oxide dust in the form of sulfides. The base load furnace can also be complemented by employing pyrolysis gases.

The gas mixture aspirated via the aspirating device 20 in the reaction stage 1, essentially containing $H_2$, CO, hydrocarbons and possibly further gases, is split into various fractions by means of a filter arrangement 22. For one, fine dust transported along in the gas flow and containing pyrolysis residue bonded to the fine-particle calcium oxide, is separated. Also, following the separation of fine dust, combustion gases 24 are separated in the form of short-chain hydrocarbons, hydrogen and carbon monoxide.

The combustion gases can be further separated in the process, so that carbon monoxide is obtained as a possible synthesis gas 26 separately from hydrogen and hydrocarbons, and the hydrocarbons are obtained as possible heating/propulsion materials 28. Hydrogen can be obtained and utilized as a chemical base material.

A further advantageous process consists in converting the gas mixture, after separation of the fine dust by means of the water gas shift reaction 30 through a catalyzed reaction with water vapor, essentially into hydrogen and carbon dioxide.

Alternatively, it is also possible to do without the separation, or respectively conversion of the gas components, and to use the mixture of short-chain hydrocarbons, hydrogen and carbon monoxide directly thermally.

In the present case, for thermal use the carbon monoxide being created in large amounts because of the feeding-in of $CO_2$ is supplied in a parallel industrial manufacturing process, for example illustrated in FIG. 1 as a calcination process performed in four furnaces 5 to 8. The carbon dioxide again being generated in the waste gas can be entirely, or also partially reused in the combustion gas generation. Shown here is the use of the pyrolysis gases/combustion gases in all kilns 5, 6, 7, 8 used, but only the $CO_2$ waste gases from the two kilns 7 and 8 are reprocessed. Here it is particularly advantageous to operate the calcination process with pure oxygen or oxygen-enriched air Z as the oxidation gas, since in this case a highly-concentrated, $CO_2$-containing waste gas is obtained. This is advantageous in contrast to an operation with combustion air, since no, or only little inert gas (nitrogen) is introduced into the combustion gas generation. High proportions of inert gas lead to a very high gas charge and thereby limit the reuse capability of the combustion gas generation, as well as the caloric value of the generated combustion gas.

The device 10 for executing the method provides for the object of the reaction bed containing the pyrolyzable organic mass to be executed by means a chute 32. The chute is open at the top and assures a continuous reserve of pyrolyzable mass in the reaction bed. The guidance of the reaction can take place in accordance with the carbon dioxide content of the aspirated gas mixture and in this way determines, for one, the speed at which the metering device 14 continuously conducts the solid mass flow through the four reaction stages and, furthermore the amount of additional thermal energy which is introduced into the reaction stage 3 by means of a burner device 34.

Prior to its removal, possibly contained heavy metal residue undergoes a direct surface cooling by $CO_2$ from the carbon dioxide introduced on the flow-off side of the solid mass flow.

Halogens, as well as heavy metals, which can be contained in the pyrolyzable organic mass, occur as oxides, or hydroxides or halides, bonded in the form of dust and solid residue materials to calcium oxide particles.

The combustion gas generation stage 1 preferably has a controlled oxygen introduction 36, along with an additional fuel gas introduction, if required, by means of which a predetermined temperature profile is maintained in this reaction stage by means of post-oxidation in the course of fresh pyrolyzable material sliding down.

In connection with the above described method it is possible to convert various halogen contents of up to 50% in the pyrolyzable organic mass into products low in noxious materials, because in direct contact with the calcium oxide bed, halogens occur in dust and solid residues as calcium halides and halides of metals in solid form. The limit values for emissions of dioxins and furans are dependably maintained.

Besides, heavy metals are also bonded as oxides to calcium oxide and calcium hydroxide particles and are separated in solid form from the solid residue materials and the dust. Pyrolyzable organic masses of high heavy metal content can be used here without a contamination of the generated combustion gases occurring.

The energy recovery in the form of carbon monoxide, which is subsequently burned to create carbon dioxide and releases thermal energy in the process, permits the supply of industrial processes with thermal energy via a gas distribution network.

EXEMPLARY EMBODIMENTS

The following exemplary embodiments are intended to explain the instant invention, but not to limit it.

Example 1

In a pilot installation corresponding to the device 10, a reaction bed 18, consisting of coarse pieces of quicklime, was continuously conducted in a cycle in a mass flow of 1,500 kg/h. Heating of the carbon monoxide generation stage 3 by means of natural gas and oxygen was set by means of a burner system 34 in such a way that in the combustion gas generation stage 1 a temperature of 550 to 600° C. prevailed, and in the carbon monoxide generation stage 3 a temperature of approximately 1,000 to 1,200° C. 600 kg/h of a mixed plastic fraction (of a calorific value of 6.94 kW/kg and a chlorine content of 1.6%), and 1,500 kg/h of hard coal (bituminous coal of a carbon content of approximately 73.5%) were continuously mixed in to the reaction bed at 18. Simultaneously, carbon dioxide in a mass flow of 2,000 kg/h was metered in at 12 via the cooling stage 4.

The combustion gas being generated was drawn off the combustion gas generation stage 1 by means of a gas blower through a thermally resistant gas filter 22 and a downstream-connected gas cooler.

After a stable operational state during continuous operation had been achieved, the operating parameters have remained stable at a feed-in amount of natural gas of 300 kg/h. The parameters are represented in the following Table 2:

TABLE 2

| | |
|---|---|
| Temperature, combustion gas generating stage 1 | 580 to 630° C. |
| Temperature, intermediate stage 2 | 870 to 910° C. |
| Temperature, carbon monoxide generation stage 3 | 1100 to 1200° C. |
| Temperature, cooling stage 4 | 40 to 70° C. |
| Temperature, entry, gas filtration | 430 to 540° C. |
| Temperature, exit, gas cooler | 45 to 50° C. |
| Pressure in the combustion gas generation stage | −50 to −30 mbar |
| Pressure in the carbon monoxide generation stage | 10 to 25 mbar |

To achieve a complete gasification of the entire carbon charge in the reactor, water was additionally metered in at a mass flow of 1,750 kg/h in the carbon monoxide generation stage 3.

The mass flow of the combustion gas downstream of the gas cooler was continuously measured and the composition was determined by means of a gas analysis. The following table 3 shows the detected average values:

TABLE 3

| | |
|---|---|
| Mass flow combustion gas (downstream of gas cooler) | 8058 Nm³/h |
| Caloric value (HU) | 3.48 kW/Nm³ |
| Carbon monoxide content | 49.0 vol % |
| Hydrogen content | 44.1 vol % |
| Methane content | 4.3 vol % |
| Ethane content | 0.3 vol % |
| Carbon dioxide | 1.2 vol % |

In order to achieve as autothermal as possible an operation, the amount of natural gas in the burner system 34 was reduced to 50 kg/h and, for equalizing the carbon-oxygen ratio, the admixture of hard coal 18 was increased by a further 1,000 kg/h to 2,500 kg/h, and the amount of water in the carbon monoxide generation stage was reduced to 1,000 kg/h.

After a stable operating stage had been achieved, a changed amount of gas and of the gas composition resulted. The data are represented in the following Table 4.

TABLE 4

| | |
|---|---|
| Mass flow, combustion gas (downstream of gas cooler) | 7876 Nm³/h |
| Caloric value (HU) | 3.56 kW/Nm³ |
| Carbon monoxide content | 62.8 vol % |
| Hydrogen content | 28.8 vol % |
| Methane content | 5.2 vol % |
| Ethane content | 0.3 vol % |
| Carbon dioxide | 1.5 vol % |

Besides the gas analysis represented in Table 4, in the course of this test phase a partial flow of the raw gas was isokinetically drawn off upstream of the gas filter arrangement 22 and the hot gas was conducted through a dust precipitator, which was cooled to 0 to 5° C. A dioxin and furan analysis was performed on the precipitated dust which, under these temperature conditions, almost quantitatively contains all possibly created dioxins and furans. The results are represented in the following Table 5:

TABLE 5

| Dioxins/Furans (PCDF/PCDD) Content TEQ (WHO) excl. . BG [a] [ng/kg] | Dioxins/Furans (PCDF/PCDD) Content TEQ (WHO) incl. . BG [b] [ng/kg] |
|---|---|
| <10 | <10 |

From other thermal utilization methods of halogen-containing plastic fractions, dioxin and furan contents >1,000 ng/kg TEQ in such pyrolysis or combustion dust are known to be quite customary.

The following energy and $CO_2$ balance results from the stationary operation:

| The following were supplied to the system: | |
|---|---|
| 50 kg/h of natural gas | 0.69 MW/h |
| corresponds to a caloric value (HU) of: | |
| 2,500 kg/h hard coal | 19.9 MW/h |
| corresponds to a caloric value (HU) of: | |
| 1,000 kg/h of water | |
| 600 kg/h of mixed plastics | |
| (addition for recycling) | |
| 2,000 kg/h of $CO_2$ | |
| The following was obtained from the system: | |
| 7876 $Nm^3$ of combustion gas | 3.56 KW/$Nm^3$ |
| having a caloric value of | |
| Corresponds to a total energy equivalent | 28.04 MW/h |
| of the combustion gas of: | |
| $CO_2$ residue in the combustion gas: | 236 kg/h |

Results:

In Example 1 it was possible to realize the reforming of a mass flow of 1764 kg/h, together with the creation of fresh combustion gas, by employing a mass flow of 600 kg/h of a mixed plastic waste fraction of a caloric value (HU) of 6.94 kW/kg and 1.6% chlorine as the energy supplier and partially as carbon provider in connection with the method of the invention. The carbon balance was compensated by means of the additional employment of 2,500 kg/h of hard coal (bituminous coal) as the carbon carrier and 1,000 kg/h of water. A formation of dioxins and furans in the raw gas dust could not be established.

Example 2

In a pilot installation corresponding to the device 10, a reaction bed 18, consisting of coarse pieces of quicklime, was continuously conducted in a cycle in a mass flow of 1,500 kg/h. Heating of the carbon monoxide generation stage 3 by means of natural gas and oxygen was adjusted in a burner system 34 in such a way that in the combustion gas generation stage 1 a temperature of 550 to 600° C. prevailed, and in the carbon monoxide generation stage 3 a temperature of approximately 1,000 to 1,200° C. 600 kg/h of a mixed plastic fraction (of a caloric value of 6.94 kW/kg and a chlorine content of 1.6%), and 2,000 kg/h of scrap wood (charged A4 wood of a carbon content of approximately 39.9%) were mixed in 18. At the same time, carbon dioxide 12 in a mass flow of 2,000 kg/h was metered in via the cooling stage 4.

The combustion gas being generated was drawn off the combustion gas generation stage 1 by means of a gas blower through a thermally resistant gas filter 22 and a downstream-connected gas cooler.

After a stable operational state during continuous operation had been achieved, the operating parameters have remained stable at a feed-in amount of natural gas of 300 kg/h. The parameters are represented in the following Table 6:

TABLE 6

| Temperature, combustion gas generating stage 1 | 520 to 590° C. |
|---|---|
| Temperature, intermediate stage 2 | 780 to 820° C. |
| Temperature, carbon monoxide generation stage 3 | 1000 to 1100° C. |
| Temperature, cooling stage 4 | 30 to 55° C. |
| Temperature, entry, gas filtration | 425 to 470° C. |
| Temperature, exit, gas cooler | 20 to 35° C. |
| Pressure in the combustion gas generation stage | −50 to −30 mbar |
| Pressure in the carbon monoxide generation stage | 10 to 25 mbar |

To achieve a complete gasification of the entire carbon charge in the reactor, water was additionally metered in at a mass flow of 1,000 kg/h in the carbon monoxide generation stage 3.

The mass flow of the combustion gas downstream of the gas cooler was continuously measured and the composition was determined by means of a gas analysis. The following table 7 shows the detected average values:

TABLE 7

| Mass flow combustion gas (downstream of gas cooler) | 7614 $Nm^3$/h |
|---|---|
| Caloric value (HU) | 3.26 kW/$Nm^3$ |
| Carbon monoxide content | 48.0 vol % |
| Hydrogen content | 35.6 vol % |
| Methane content | 5.3 vol % |
| Ethane content | 0.4 vol % |
| Carbon dioxide | 2.3 vol % |

In order to achieve as autothermal as possible an operation, the amount of natural gas in the burner system 34 was reduced to 50 kg/h and, for equalizing the carbon-oxygen ratio, the admixture of scrap wood 18 was increased by a further 2,000 kg/h to 4,000 kg/h, and the amount of water in the carbon monoxide generation stage was stopped.

After a stable operating stage had been achieved, a changed amount of gas and of the gas composition resulted. The data are represented in the following Table 8.

TABLE 8

| Mass flow, combustion gas (downstream of gas cooler) | 7384 $Nm^3$/h |
|---|---|
| Caloric value (HU) | 3.21 kW/$Nm^3$ |
| Carbon monoxide content | 60.3 vol % |
| Hydrogen content | 16.3 vol % |
| Methane content | 6.7 vol % |
| Ethane content | 0.4 vol % |
| Carbon dioxide | 3.0 vol % |

Besides the gas analysis represented in Table 8, in the course of this test phase a partial flow of the raw gas was isokinetically drawn off upstream of the gas filter arrangement 22 and the hot gas was conducted through a dust precipitator, which was cooled to 0 to 5° C. A dioxin and furan analysis was performed on the precipitated dust which, under these temperature conditions, almost quantitatively contains all possibly created dioxins and furans. The results are represented in the following Table 9:

TABLE 9

| Dioxins/Furans (PCDF PCDD) Content TEQ (WHO) excl. . BG [a] [ng/kg] | Dioxins/Furans (PCDF/PCDD) Content TEQ (WHO) incl. . . BG [b] [ng/kg] |
|---|---|
| <10 | <10 |

From other thermal utilization methods of halogen-containing plastic fractions, dioxin and furan contents >1,000 ng/kg TEQ in such pyrolysis or combustion dust are known to be quite customary.

The following energy and $CO_2$ balance results from the stationary operation:

| The following were supplied to the system: | |
|---|---|
| 50 kg/h of natural gas, corresponds to a caloric value (HU) of: | 0.69 MW/h |
| 4,000 kg/h scrap wood, corresponds to a caloric value (HU) of: | 16.18 MW/h |
| 600 kg/h of mixed plastics (addition for recycling) | |
| 2,000 kg/h of $CO_2$ | |
| The following was obtained from the system: | |
| 7384 $Nm^3$ of combustion gas having a caloric value of | 3.21 $KW/Nm^3$ |
| corresponds to a total energy equivalent of the combustion gas of: | 23.70 MW/h |
| $CO_2$ residue in the combustion gas: | 423 kg/h |

Results:

In Example 2 it was possible to realize the reforming of a mass flow of 1577 kg/h $CO_2$, together with the creation of fresh combustion gas, by employing a mass flow of 600 kg/h of a mixed plastic waste fraction of a caloric value (HU) of 6.94 kW/kg and 1.6% chlorine as the energy supplier and partially as carbon provider in connection with the method of the invention. The carbon balance was compensated by means of the additional employment of 4,000 kg/h of scrap wood as the carbon carrier. A formation of dioxins and furans in the raw gas dust could not be established.

The invention claimed is:

1. A method for reprocessing $CO_2$-containing exhaust gases in a multi-stage reduction process, the $CO_2$-containing waste gas being conducted in a solid mass flow of bulk material, which cannot be gasified, and a thermally decomposable organic mass, through a plurality of zones to produce pyrolysis gases, said method comprising:
   a. thermally decomposing organic mass of a solid mass flow of bulk material under reducing conditions to form i) pyrolysis gases comprising short-chain hydrocarbons, hydrogen and carbon monoxide, along with ii) the creation of coke and a residue in a combustion gas generating stage;
   b. performing oxidation of the coke in an intermediate stage at an increasing temperature, in which the carbon monoxide being created is drawn off opposite the direction of the solid mass flow in the direction of the combustion gas generating stage;
   c. converting remaining coke residue, together with carbon dioxide, in a carbon monoxide generating stage at 800 to 1,600° C. to carbon monoxide while adjusting the pressure and temperature in accordance with the Boudouard equilibrium;
   d. cooling solid residue materials and coarse pieces of bulk material which was not gasified in a cooling stage in the $CO_2$ counterflow to below 100° C. and are moved out; and
   e. returning at least the removed bulk material which was not gasified into the circulation after having been taken out.

2. The method in accordance with claim 1, wherein in the intermediate stage a temperature of 600 to 1,000° C. is set and the pressure is reduced, so that in this stage a pyrolysis of the organic mass and the Boudouard equilibrium reaction run simultaneously at low pressure and low temperature.

3. The method in accordance with claim 2, wherein the pyrolysis gases are removed by means of an aspirating device, which creates the underpressure in the intermediate stage.

4. The method in accordance with claim 1, wherein a mixture of coarse and fine bulk material is employed as a pressure reservoir in a pressure compensating zone above a combustion gas generating zone.

5. The method in accordance with claim 1, wherein a temperature and pressure control takes place by means of the composition of the solid masses and/or their throughput speed.

6. The method in accordance with claim 1, wherein a temperature and pressure control takes place by means of the ratio of the supplied, thermally-decomposable organic mass, and possibly added oxygen-containing gas, to $CO_2$ takes place.

7. The method in accordance with claim 1, wherein a carbon carrier is additionally admixed to the solid mass flow.

8. The method in accordance with claim 1, wherein water or steam is metered into the cooling stage, the intermediate stage or the carbon monoxide stage.

9. The method in accordance with claim 1, wherein the multi-stage reduction process is performed in a calcination shaft kiln furnace, in which the bulk material is conducted from the top to the bottom, so that the carbon-containing components are thermally split with extensive oxygen exclusion and with the creation of pyrolysis gases containing short-chain molecules of a chain length of <C4, and the pyrolysis gases being generated are exhausted from the calcination kiln furnace.

10. The method in accordance with claim 9, wherein basic calcinates, their precursor stages, or inert bulk materials are employed as bulk materials, preferably in the form of quicklime (CaO).

11. The method in accordance with claim 1, wherein bulk material of a grain size in the range of 0.5 to 15 cm is removed from the cooling stage for return to the cycle.

12. The method in accordance with claim 11, wherein by means of a gas filtration the pyrolysis gases are cleaned of carried-along fine dust containing pyrolysis residue bonded to the fine bulk material particles.

13. The method in accordance with claim 1, wherein the pyrolysis gases are employed as synthesis gas for chemical processes and/or for thermal uses.

14. The method in accordance with claim 1, wherein the pyrolysis gases are separated into their gas components carbon monoxide, carbon dioxide, hydrogen and hydrocarbons by means of partial liquefaction and/or pressure change absorption.

15. The method in accordance with claim 14, wherein carbon monoxide is employed as the synthesis gas for use as a material in chemical processes.

16. The method in accordance with claim 14, wherein the separated hydrogen is employed as material for thermal and/or material purposes.

17. The method in accordance with claim 14, wherein the hydrocarbons are employed for thermal and/or material purposes and/or a fuels.

18. The method in accordance with claim 1, wherein by means of a water gas shift reaction through a catalyzed reaction below 500° C. with water vapor, the pyrolysis gases are essentially converted into hydrogen and carbon dioxide, which are separated by means of physical separation methods, wherein hydrogen is employed for thermal and/or material uses, and the $CO_2$ being generated is partially returned for constituting the counterflow.

19. The method in accordance with claim 1, wherein the $CO_2$ waste gas to be reconstituted is generated in a combustion process by the use of fossil fuels, and the pyrolysis gases being created in the course of reconstitution are again employed in the combustion process.

20. The method in accordance with claim 1, wherein the $CO_2$-containing waste gas is generated in a calcination process, in which carbonates are converted into oxides by splitting them off from $CO_2$, in the course of which the pyrolysis gases being created during reconstitution are employed for providing a portion of the heat energy required for the calcination process.

\* \* \* \* \*